United States Patent
Lee et al.

(10) Patent No.: US 11,628,852 B2
(45) Date of Patent: Apr. 18, 2023

(54) DRIVING APPARATUS AND DRIVING CONTROLLING METHOD

(71) Applicant: HANWHA AEROSPACE CO., LTD., Changwon-si (KR)

(72) Inventors: Yun Su Lee, Changwon-si (KR); Ki Chong Kim, Changwon-si (KR); Tae Jun Yoon, Changwon-si (KR)

(73) Assignee: HANWHA AEROSPACE CO., LTD., Changwon-shi (KR)

( * ) Notice: Subject to any disclaimer, the term of this patent is extended or adjusted under 35 U.S.C. 154(b) by 29 days.

(21) Appl. No.: 17/194,422

(22) Filed: Mar. 8, 2021

(65) Prior Publication Data

US 2022/0185305 A1 Jun. 16, 2022

(30) Foreign Application Priority Data

Dec. 11, 2020 (KR) .................. 10-2020-0173441

(51) Int. Cl.
*B60W 50/10* (2012.01)
*B60W 10/08* (2006.01)
*B60W 10/20* (2006.01)

(52) U.S. Cl.
CPC ............ *B60W 50/10* (2013.01); *B60W 10/08* (2013.01); *B60W 10/20* (2013.01)

(58) Field of Classification Search
CPC ....... B60W 50/10; B60W 10/08; B60W 10/20
USPC .............................................. 701/41
See application file for complete search history.

(56) References Cited

U.S. PATENT DOCUMENTS

| | | | |
|---|---|---|---|
| 2019/0025816 A1* | 1/2019 | Vogt ..................... | G05D 1/0212 |
| 2019/0135265 A1* | 5/2019 | Shin .................... | B60W 30/182 |
| 2020/0110402 A1* | 4/2020 | Golgiri ................. | A63H 30/04 |
| 2020/0198620 A1* | 6/2020 | Nakata ............. | B60W 60/0053 |
| 2022/0135039 A1* | 5/2022 | Jardine ........... | B60W 30/18159 |
| | | | 701/26 |

FOREIGN PATENT DOCUMENTS

| | | |
|---|---|---|
| JP | 6-269524 A | 9/1994 |
| JP | 6645417 B2 | 2/2020 |
| KR | 10-1849344 B1 | 4/2018 |

* cited by examiner

*Primary Examiner* — Yi-Kai Wang
(74) *Attorney, Agent, or Firm* — Sughrue Mion, PLLC

(57) ABSTRACT

A driving apparatus includes a body; at least one sensor that is exposed to an outside of the body and configured to sense a user input for controlling driving of the body; a controller configured to generate at least one control command for driving of the body according to the sensed user input; and a motor that is configured to generate a driving force for driving the body according to the generated at least one control command.

20 Claims, 14 Drawing Sheets

| SENSING UNIT | DRIVING COEFFICIENT | STEERING COEFFICIENT |
|---|---|---|
| FIRST SENSING UNIT | -1 | 0 |
| SECOND SENSING UNIT | -0.5 | -1 |
| THIRD SENSING UNIT | 0.5 | -1 |
| FOURTH SENSING UNIT | 1 | 0 |
| FIFTH SENSING UNIT | 0.5 | 1 |
| SIXTH SENSING UNIT | -0.5 | 1 |

DRIVING APPARATUS AND DRIVING CONTROLLING METHOD

CROSS-REFERENCE TO THE RELATED APPLICATION

This patent application claims the benefit of Korean Patent Application No. 10-2020-0173441, filed on Dec. 11, 2020, which is hereby incorporated by reference in its entirety into this application.

BACKGROUND

1. Field

Embodiments of the present disclosure relate to a driving apparatus and a driving controlling method, and more particularly, to a driving apparatus and a driving controlling method capable of changing a direction by manual operation.

2. Description of Related Art

As a driving method of the hybrid-type driving device, manual control, remote control, and autonomous driving may be used. The user can board the driving device and control the driving device or remotely control the driving device. Alternatively, a driving device equipped with an autonomous driving function may autonomously drive while sensing the surroundings.

The user must board the driving device for manual control, and needs a separate control device to control the driving device for remote control. That is, even in the case of moving the driving device for a short distance, the user must perform a cumbersome task or carry the control device.

Therefore, there is a need for the emergence of a solution for moving the driving device in a more convenient way.

SUMMARY

A problem solved by embodiments of the present disclosure is to provide a driving device and a driving controlling method capable of changing a direction by manual operation.

The problems solved by embodiments of the present disclosure are not limited to the problems mentioned above, and other objects not mentioned will be clearly understood by those skilled in the art from the following descriptions.

According to one or more embodiments, a driving apparatus is provided. The driving apparatus includes: a body; at least one sensor that is exposed to an outside of the body and configured to sense a user input for controlling driving of the body; a controller configured to generate at least one control command for driving of the body according to the sensed user input; and a motor that is configured to generate a driving force for driving the body according to the generated at least one control command.

According to an embodiment, the at least one sensor includes a contact type sensor that is configured to sense a pressure applied by pressing of an object.

According to an embodiment, the at least one control command, generated by the controller, includes a control command for changing speed of the body according to a magnitude of the pressure sensed by the contact type sensor.

According to an embodiment, the at least one sensor includes a non-contact type sensor that is configured to sense an object adjacent to the non-contact type sensor at a predetermined distance.

According to an embodiment, the at least one control command, generated by the controller, includes a control command for changing speed of the body according to a distance between the non-contact type sensor and the object that is adjacent to the non-contact type sensor.

According to an embodiment, the at least one control command includes: a driving command for moving the body forward or backward; and a steering command for turning the body left or right.

According to an embodiment, the at least one sensor is a plurality of sensors that are arranged at different points of the body.

According to an embodiment, the controller is configured to generate the at least one control command for driving of the body in accordance with a driving direction of the body that is preset for each of the plurality of sensors.

According to an embodiment, the controller is further configured to generate a stop control command, for stopping driving of the body, based on two or more sensors of the plurality of sensors sensing a respective user input.

According to an embodiment, the driving apparatus further includes a driving unit that is configured to drive the body with the driving force of the motor, wherein the driving unit is a wheel, a track, a leg, or a propeller.

According to one or more embodiments, a driving controlling method for controlling driving of a driving apparatus is provided. The driving controlling method includes: sensing a user input for controlling driving of a body of the driving apparatus by at least one sensor of the driving apparatus that is exposed to an outside of the body; generating at least one control command for driving the body according to the sensed user input; and generating a driving force, for driving the body, according to the generated at least one control command.

According to an embodiment, the at least one sensor includes a contact type sensor that is configured to sense the user input, and the sensing the user input includes sensing, by the contact type sensor, a pressure applied by pressing of an object.

According to an embodiment, the generating the at least one control command includes generating a control command for changing speed of the body according to a magnitude of the pressure sensed by the contact type sensor.

According to an embodiment, the at least one sensor includes a non-contact type sensor that is configured to sense the user input, and the sensing the user input includes sensing, by the non-contact type sensor, an object adjacent to the non-contact type sensor at a predetermined distance.

According to an embodiment, the generating the at least one control command includes generating a control command for changing speed of the body according to a distance between the non-contact type sensor and the object that is adjacent to the non-contact type sensor.

According to an embodiment, the at least one control command includes: a driving command for moving the body forward or backward; and a steering command for turning the body left or right.

According to an embodiment, the at least one sensor is a plurality of sensors that are arranged at different points of the body.

According to an embodiment, the generating the at least one control command for driving the body includes generating the at least one control command in accordance with a driving direction of the body that is preset for each of the plurality of sensors.

According to an embodiment, the at least one sensor is a plurality of sensors, and the method further includes generating a stop control command, for stopping the driving of the body, based on two or more sensors of the plurality of sensors sensing a respective user input.

According to an embodiment, the driving apparatus further includes a driving unit that is configured to drive the body with the driving force, and the driving unit is a wheel, a track, a leg, or a propeller.

Details of other embodiments of the present disclosure are included in the detailed description and drawings.

According to the driving device and the driving controlling method of an embodiment of the present disclosure as described above, since the direction can be changed by manual operation, there is an advantage that the user can easily move the driving device.

The effects of embodiments of the present disclosure are not limited to the effects mentioned above, and other effects not mentioned will be clearly understood by those skilled in the art from the disclosure.

BRIEF DESCRIPTION OF THE DRAWINGS

FIG. 4 is a diagram showing a coefficient table.

DETAILED DESCRIPTION

Figure 1:
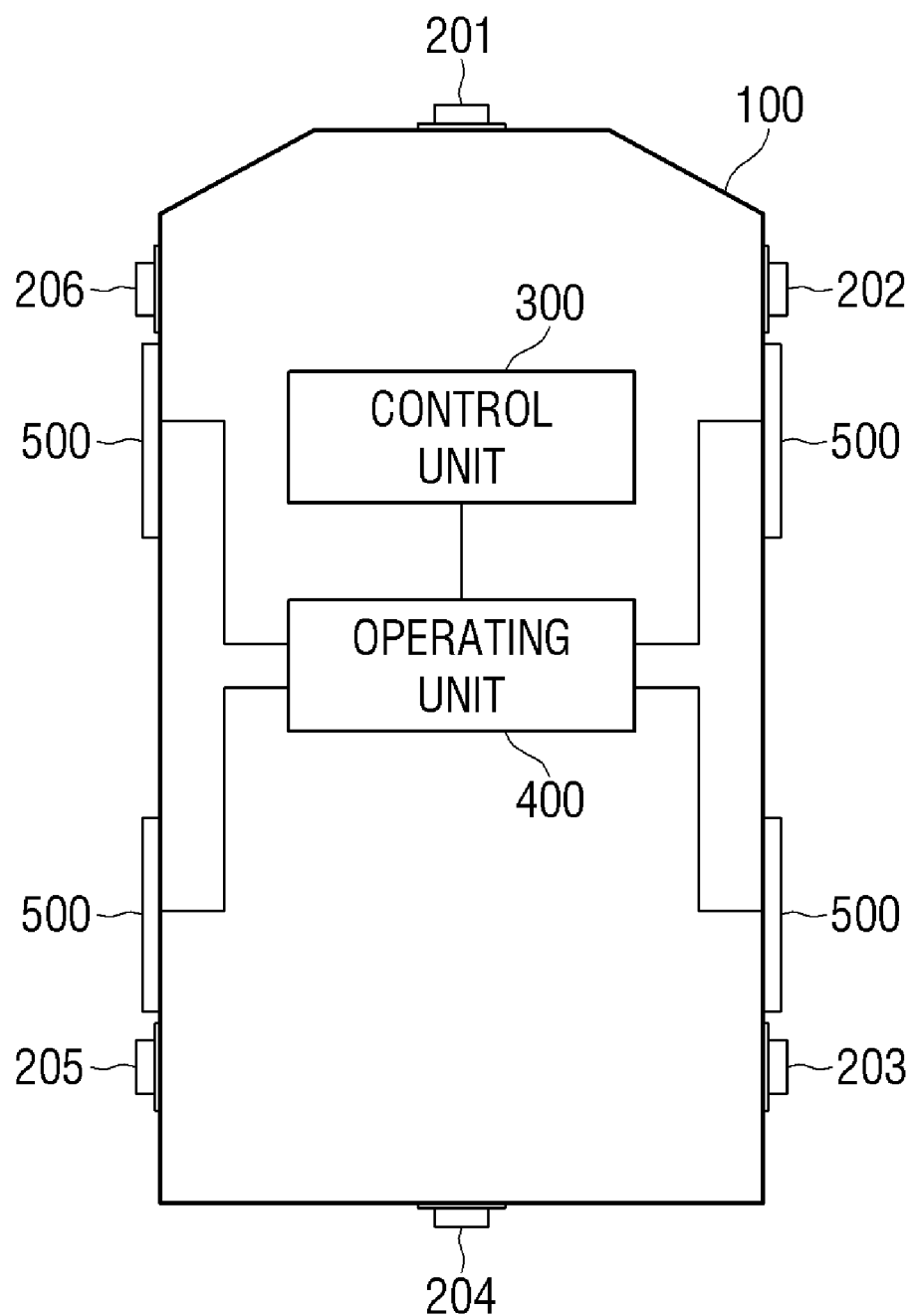
FIG. 1 is a diagram showing a driving device according to an embodiment of the present disclosure.

Hereinafter, non-limiting example embodiments of the present disclosure will be described in detail with reference to the accompanying drawings. Advantages and features of embodiments of the present disclosure, and a method of achieving them will be apparent with reference to the embodiments described below in detail together with the accompanying drawings. However, embodiments of the present disclosure are not limited to the embodiments to be described below, but may be implemented in various different forms, and these embodiments are only provided to make the disclosures of the present disclosure complete, and to fully inform the scope of the disclosure to those of ordinary skill in the technical field to which the present disclosure belongs. The same reference numerals refer to the same components throughout the specification.

Unless otherwise defined, all terms (including technical and scientific terms) used in the present specification may be used as meanings that can be commonly understood by those of ordinary skill in the art to which the present disclosure belongs. In addition, terms defined in a commonly used dictionary are not interpreted ideally or excessively unless explicitly defined specifically.

Figure 2:
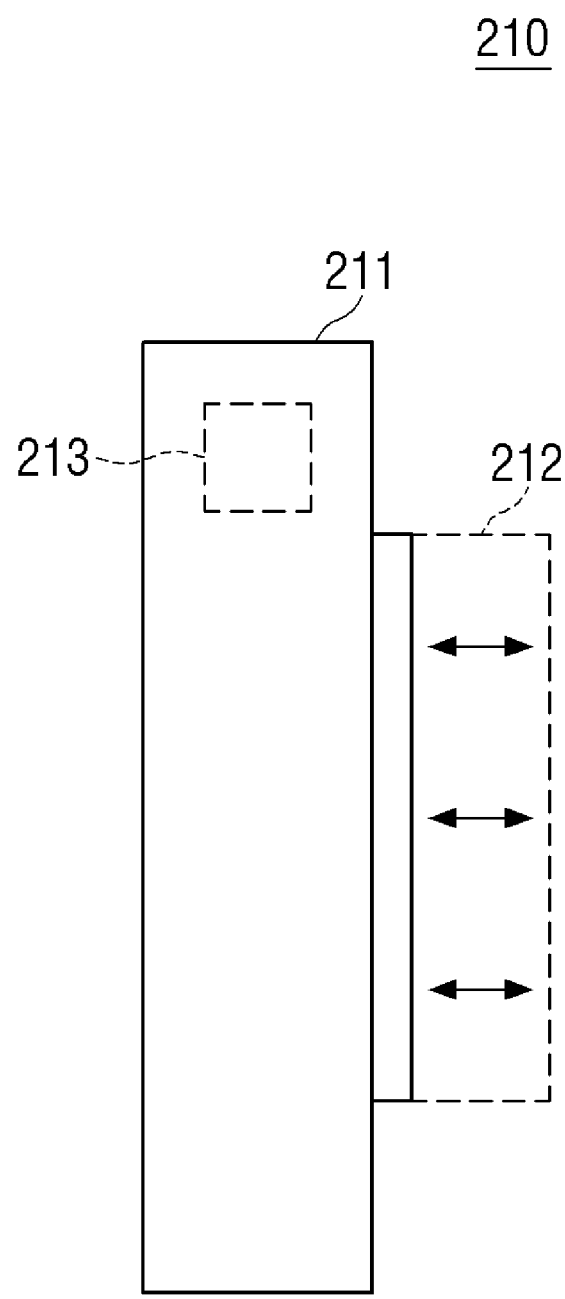
FIG. 2 is a diagram showing a contact type sensing unit.
Figure 3:
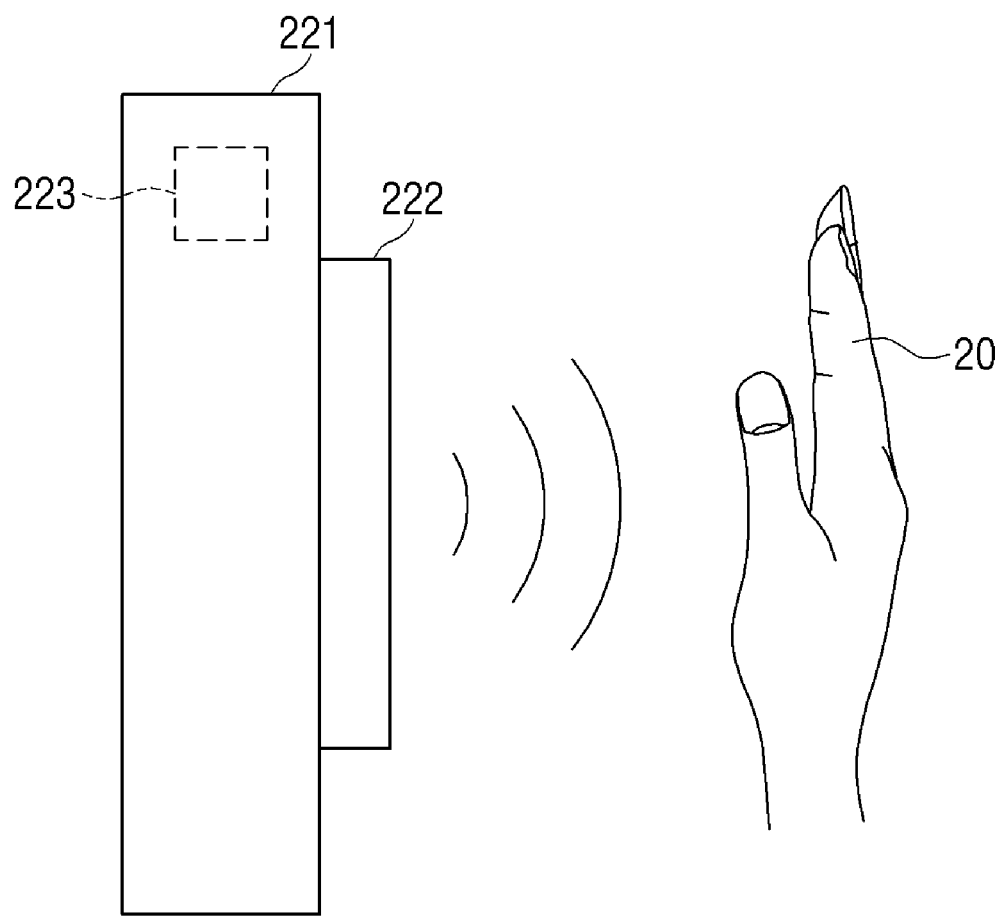
FIG. 3 is a diagram showing a non-contact type sensing unit.

FIG. 1 is a diagram showing a driving device according to an embodiment of the present disclosure, FIG. 2 is a diagram showing a contact type sensing unit, FIG. 3 is a diagram showing a non-contact type sensing unit, and FIG. 4 is a diagram showing a coefficient table.

Referring to FIG. 1, a driving device 10 according to an embodiment of the present disclosure includes a body 100, first to sixth sensing units 201 to 206 (e.g. sensors), a control unit 300 (e.g. a controller), an operating unit 400 (e.g. a motor), and a driving unit 500.

The body 100 may form the exterior of the driving device 10. The sensing units 201 to 206, the control unit 300 and the operating unit 400 may be provided inside or outside the body 100.

The first to sixth sensing units 201 to 206 are exposed to the outside of the body 100 to sense a user input for controlling the driving of the body 100. The first to sixth sensing units 201 to 206 may be a contact type sensing unit 210 (see FIG. 2) or a non-contact type sensing unit 220 (see FIG. 3).

The contact type sensing unit 210 may sense a pressure pressed by the object, and the non-contact type sensing unit 220 may sense an adjacent object at a predetermined distance from the non-contact type sensing unit 220.

Referring to FIG. 2, the contact type sensing unit 210 may include a base 211, a switch 212 and a communication unit 213.

The base 211 may be attached to and fixed to the body 100. The switch 212 may be coupled to move its position with respect to the base 211. For example, at least a part of the switch 212 may be accommodated in the base 211 and the rest of the switch 212 may be exposed to the outside of the base 211. When the external pressure is applied, the switch 212 is inserted into the base 211, and when the external pressure is released, the switch 212 may be released from the base 211.

The depth of the switch 212 inserted into the base 211 may vary depending on the magnitude of the external pressure. The magnitude of external pressure may be sensed according to the depth of the switch 212 inserted in the base 211.

The communication unit 213 may transmit the magnitude of the external pressure to the control unit 300. The communication unit 213 may be provided inside or outside the base 211.

In the above, the contact type sensing unit 210, in which the switch 212 is inserted into the base 211, has been described, but this is illustrative, and the contact type sensing unit 210 may sense pressure due to a user input in various ways. For example, the contact type sensing unit 210 may be provided in a form, in which the switch 212 accommodates the base 211. Alternatively, the switch 212 may be provided in the form of an elastic body, and pressure by a user input may be sensed according to the degree of deformation of the switch 212.

Hereinafter, a description will be made mainly on the contact type sensing unit 210, in which the switch 212 is inserted into the base 211.

Referring to FIG. 3, the non-contact type sensing unit 220 may include a base 221, a distance sensor 222, and a communication unit 223.

The base 221 may be attached to and fixed to the body 100. The distance sensor 222 may sense a distance of an external object. That is, the distance sensor 222 is capable of sensing a distance between the distance sensor 222 and an adjacent object 20. For example, the distance sensor 222 may transmit infrared or ultrasonic waves and receive a reflected wave reflected by an object to sense a distance to an adjacent object 20.

The communication unit 223 may transmit the distance to the adjacent object 20 to the control unit 300. The communication unit 223 may be provided inside or outside the base 221.

Referring back to FIG. 1, the body 100 may be provided with a plurality of sensing units 201 to 206. The first to sixth sensing units 201 to 206 may be a contact type sensing unit 210 or a non-contact type sensing unit 220. For example, each of the first to sixth sensing units 201 to 206 may be a contact type sensing unit 210 or a non-contact type sensing unit 220. Alternatively, some of the first to sixth sensing units 201 to 206 may be a contact type sensing unit 210 and others may be a non-contact type sensing unit 220.

The control unit 300 may generate a control command for driving of the body 100 according to a user input sensed by the first to sixth sensing units 201 to 206.

In embodiments of the present disclosure, the plurality of sensing units 201 to 206 may be arranged at different points of the body 100. Here, the driving direction of the body 100 may be preset for each of the plurality of sensing units 201 to 206. FIG. 1 shows that the first to sixth sensing units 201 to 206 are provided in the body 100, hereinafter, the sensing unit provided on the front side of the body 100 is referred to as the first sensing unit 201, the sensing unit provided on the front and right side of the body 100 is referred to as the second sensing unit 202, the sensing unit provided on the rear and right side of the body 100 is referred to as the third sensing unit 203, the sensing unit provided on the rear side of the body 100 is referred to as the fourth sensing unit 204, the sensing unit provided on the rear and left side of the body 100 is referred to as the fifth sensing unit 205, and the sensing unit provided on the front and left side of the body 100 is referred to as the sixth sensing unit 206.

When the first sensing unit 201 senses a user input, the control unit 300 may generate a control command that causes the body 100 to move backward, and when the second sensing unit 202 senses a user input, the control unit 300 may generate a control command that causes the body 100 to move backward to the left, and when the third sensing unit 203 senses a user input, the control unit 300 may generate a control command that causes the body 100 to move forward to the left. In addition, when the fourth sensing unit 204 senses a user input, the control unit 300 may generate a control command that causes the body 100 to move forward, and when the fifth sensing unit 205 senses a user input, the control unit 300 300 may generate a control command that causes the body 100 to move forward to the right, and when the sixth sensing unit 206 senses a user input, the control unit 300 may generate a control command that causes the body 100 to move backward to the right.

The user can easily drive the driving device 10 in a direction he or she wants by using the first to sixth sensing units 201 to 206. In particular, the user can easily control the driving device 10 by applying pressure or bringing a hand close to one or more of the first to sixth sensing units 201 to 206 corresponding to the driving direction.

The control unit 300 may generate a control command using the coefficient table 600 illustrated in FIG. 4. The coefficient table may include driving coefficients and steering coefficients for each of the first to sixth sensing units 201 to 206.

The driving coefficient may include weights for the forward and backward movements of the driving device 10. When the driving coefficient is a positive number, it represents a weight for the forward movement of the driving device 10, and when the driving coefficient is a negative number, it represents a weight for the backward movement of the driving device 10. The steering coefficient may include a weight for direction change of the driving device 10. When the steering coefficient is a positive number, it represents a weight for the right turn of the driving device 10, and when the steering coefficient is a negative number, it represents a weight for the left turn of the driving device 10.

In embodiments of the present disclosure, the control unit 300 may control the operating unit 400 so that the speed of the body 100 is changed according to the size of the sensed result sensed by the first to sixth sensing units 201 to 206. For example, the control unit 300 may generate a control command to change the speed of the body 100 according to the magnitude of pressure sensed by the contact type sensing unit 210, or generate a control command to change the speed of the body 100 according to the distance between the non-contact type sensing unit 220 and an adjacent object 20.

The control command generated by the control unit 300 may include a driving command and a steering command. The driving command represents a command for moving the body 100 forward or backward, and the steering command may be a command for turning the body 100 left or right.

When the first to sixth sensing units 201 to 206 are the contact type sensing units 210, the driving command may be defined by an equation of $F \times DC \times Const$. Here, F is the magnitude of the pressure sensed by the first to sixth sensing units 201 to 206, DC is a driving coefficient for each of the first to sixth sensing units 201 to 206, and Const may be a constant. Const may be a value preset to adjust the size of the driving command. For example, when the magnitude of the pressure sensed by the second sensing unit 202 is 20 and Const is 1.1, the driving command may be $20 \times (-0.5) \times 1.1$.

When the first to sixth sensing units 201 to 206 are the non-contact type sensing unit 220, the driving command may be defined as an equation of $1/(1-L) \times DC \times Const$. Here, L is a distance to an adjacent object 20 (refer to FIG. 3) sensed by the first to sixth sensing units 201 to 206, DC is a driving coefficient for each of the first to sixth sensing units 201 to 206, and Const may be a constant. Const may be a value preset to adjust the size of the driving command. For example, when the distance sensed by the fifth sensing unit 205 is 15 and Const is 1.2, the driving command may be $15 \times 0.5 \times 1.2$.

The speed of the driving device 10 may be determined according to the size of the driving command. Specifically, as the absolute value of the driving command increases, the speed of the driving device 10 increases, and as the absolute value of the driving command decreases, the speed of the driving device 10 may decrease.

The steering command may be defined as an equation of $DC \times Ang$. Here, DC is a steering coefficient for each of the first to sixth sensing units 201 to 206, and Ang may be a steering angle. The steering angle may be a preset angle. For example, the maximum steering angle supported by the driving unit 500 of the driving device 10 may be set as the steering angle. When a user input is sensed by the third sensing unit 203 and Ang is 45 degrees, the steering command may be −1×45. Further, when a user input is sensed by the first sensing unit 201 and Ang is 45 degrees, the steering command may be 0×45.

The direction change angle of the driving device 10 may be determined according to the size of the steering command. Specifically, as the absolute value of the steering command increases, the direction change angle of the driving device 10 may increase, and as the absolute value of the steering command decreases, the direction change angle of the driving device 10 may decrease.

The operating unit 400 may generate a driving force for driving the body 100. Specifically, the operating unit 400 may generate a driving force for driving of the body 100 according to a control command generated by the control unit 300.

The driving force of the operating unit 400 is transmitted to the driving unit 500, and the body 100 can drive by the operation of the driving unit 500. The driving unit 500 may be provided in the form of a wheel, but also may be provided in the form of a track, a leg, or a propeller. For example, the driving device 10 according to an embodiment of the present disclosure may be provided in the form of a vehicle, a robot, a ship, or an aircraft. Hereinafter, it will be described mainly on that the driving device 10 is a vehicle or a robot driving on the ground.

FIGS. 5 to 8 are diagrams for describing the operation of the driving device.

Referring to FIGS. 5 to 8, the driving direction of the driving device 10 may be determined as a user input is sensed by a specific sensing unit.

Figure 5:
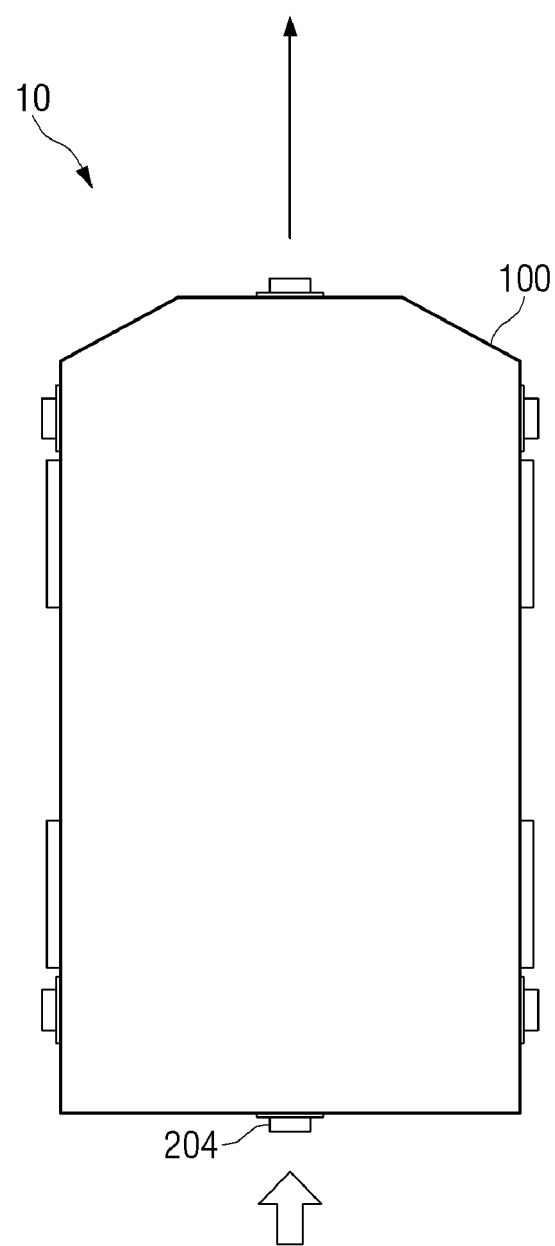
FIG. 5 is a first diagram for describing an operation of the driving device.
Figure 6:
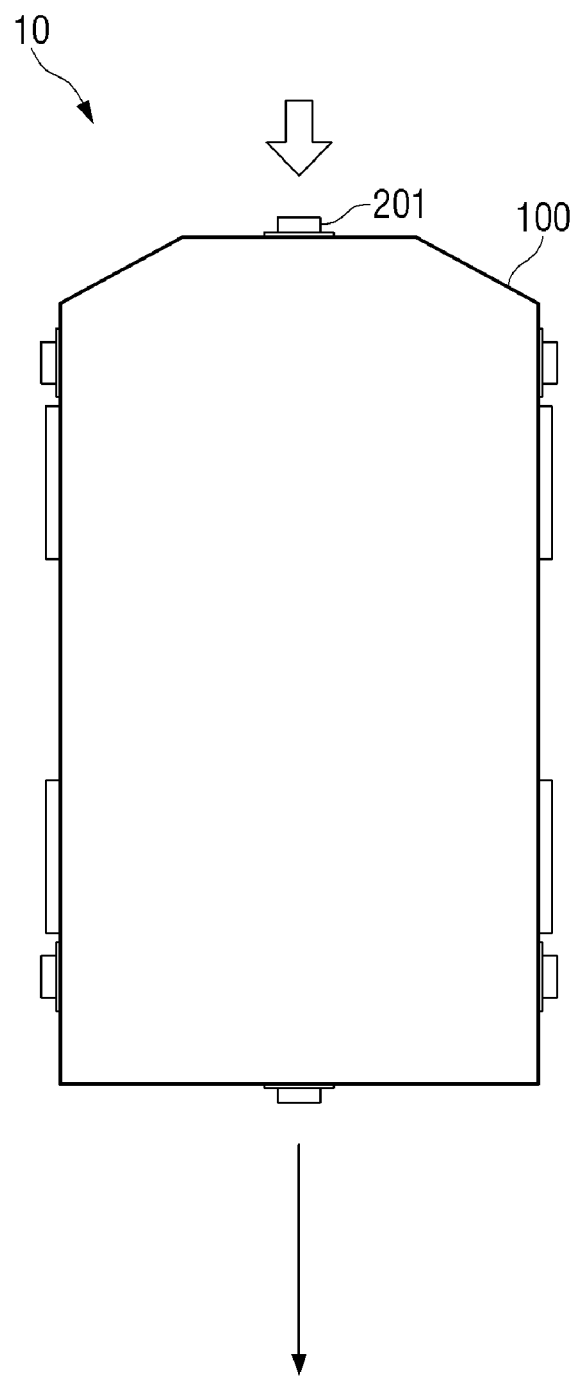
FIG. 6 is a second diagram for describing the operation of the driving device.
Figure 7:
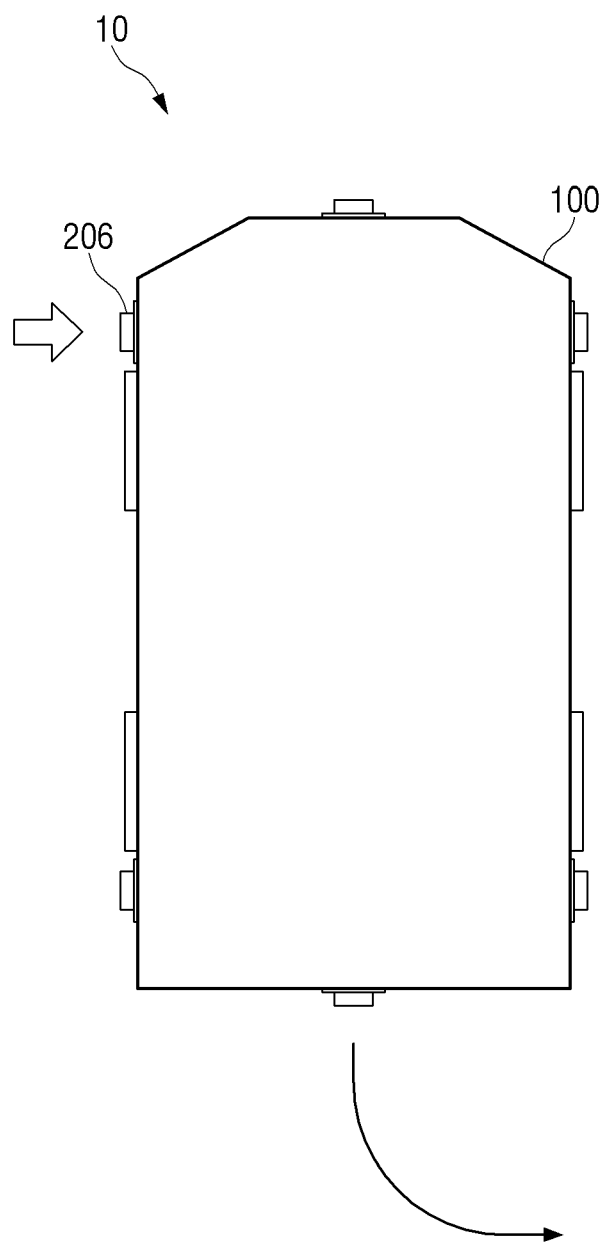
FIG. 7 is a third diagram for describing the operation of the driving device.
Figure 8:
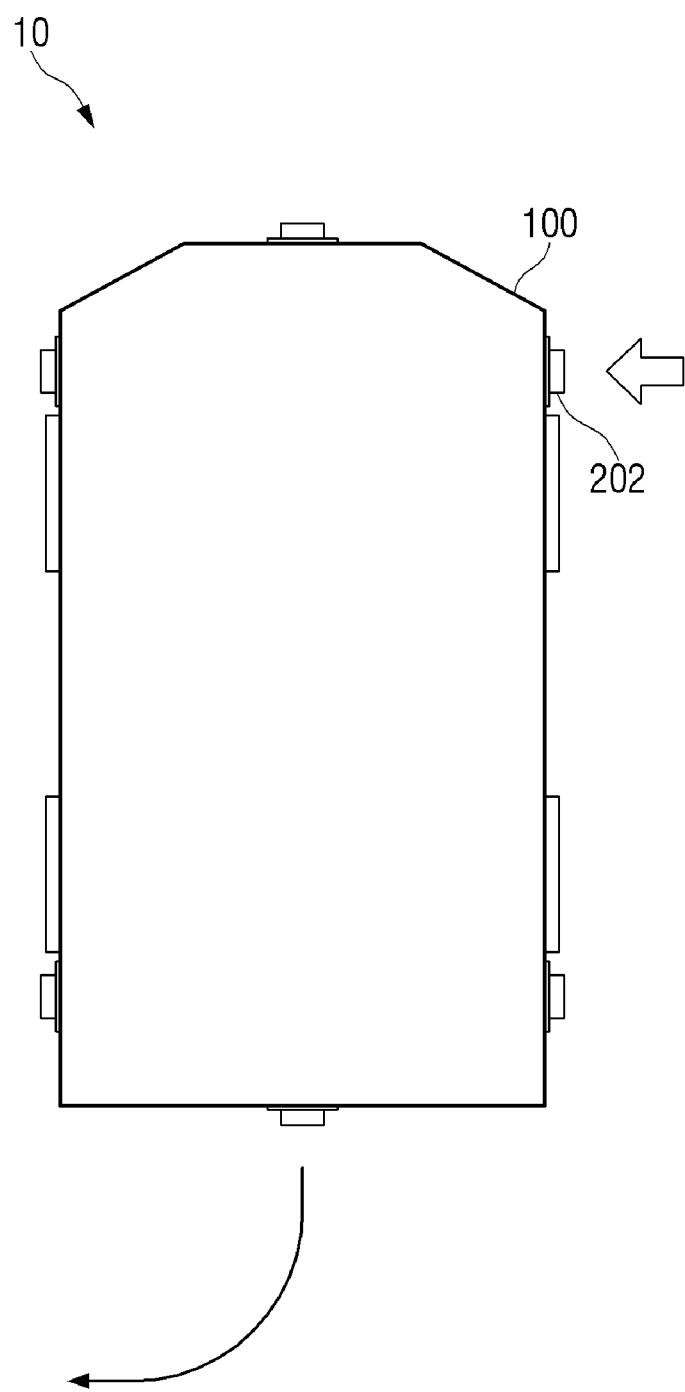
FIG. 8 is a fourth diagram for describing the operation of the driving device.

As shown in FIG. 5, when the fourth sensing unit 204 senses a user input, the driving device 10 may move forward. As shown in FIG. 6, when the first sensing unit 201 senses a user input, the driving device 10 may move backward. As shown in FIG. 7, when the sixth sensing unit 206 senses a user input, the driving device 10 may move backward to the right. As shown in FIG. 8, when the second sensing unit 202 senses a user input, the driving device 10 may move backward to the left. On the other hand, although not shown, when the third sensing unit 203 senses a user input, the driving device 10 may move forward to the left, and when the fifth sensing unit 205 senses a user input, the driving device 10 may move forward to the right.

The above has been described that the number of sensing units is six, but according to some embodiments of the present disclosure, the number of sensing units may be less than six or more than six.

Figure 9:
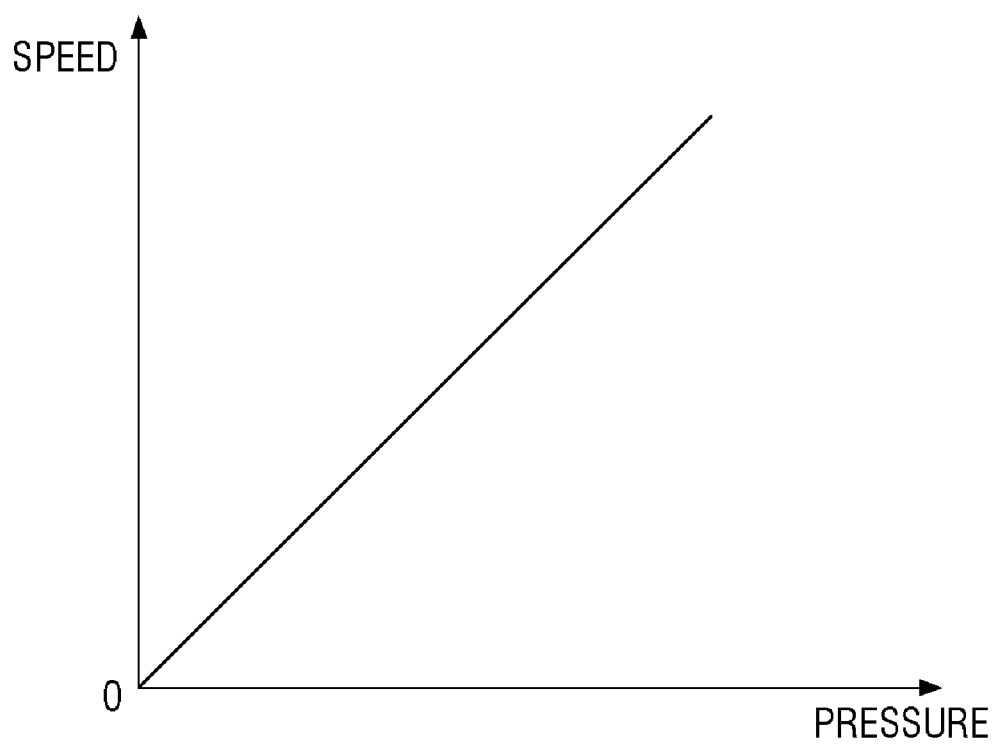
FIG. 9 is a first graph for showing the speed of the driving device according to the sensed pressure.
Figure 10:
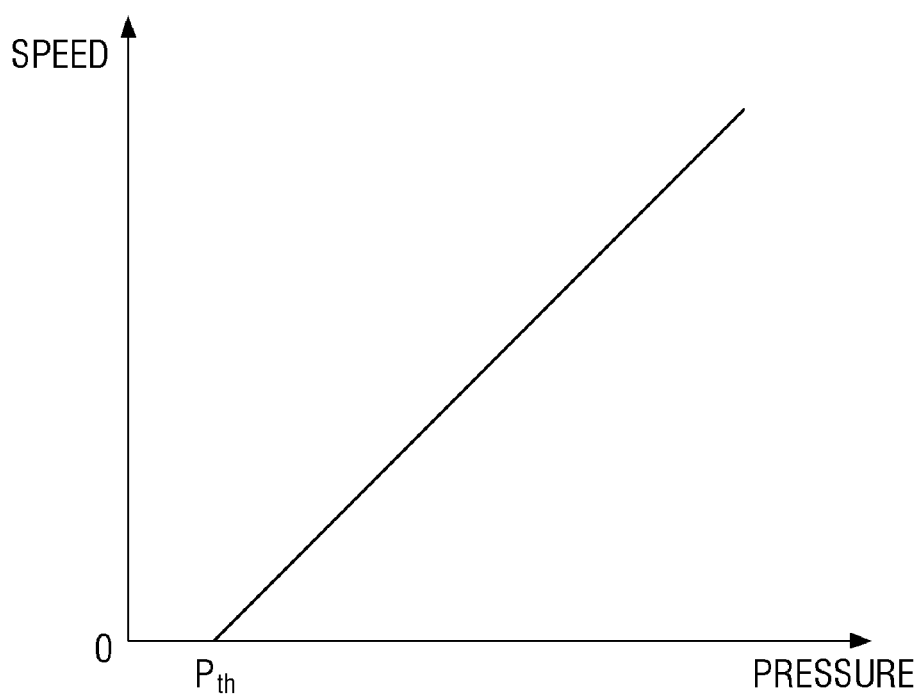
FIG. 10 is a second graph for showing the speed of the driving device according to the sensed pressure.

FIGS. 9 and 10 are graphs 701 and 702 showing the speed of the driving device according to the sensed pressure.

Referring to FIG. 9, as the pressure sensed by the contact type sensing unit 210 increases, the speed of the driving device 10 may increase.

The rate of increase in speed with increasing pressure may be predetermined. For example, the above-described constant may be appropriately determined to determine the speed according to the pressure.

Referring to FIG. 10, whether or not the driving device 10 moves may be determined based on a preset threshold pressure $P_{th}$.

The control unit 300 may control the operating unit 400 to move the driving device 10, in which the magnitude of the pressure sensed by the contact type sensing unit 210 exceeds the preset threshold pressure $P_{th}$. Accordingly, movement of the driving device 10 due to an unintended user input can be prevented.

Figure 11:
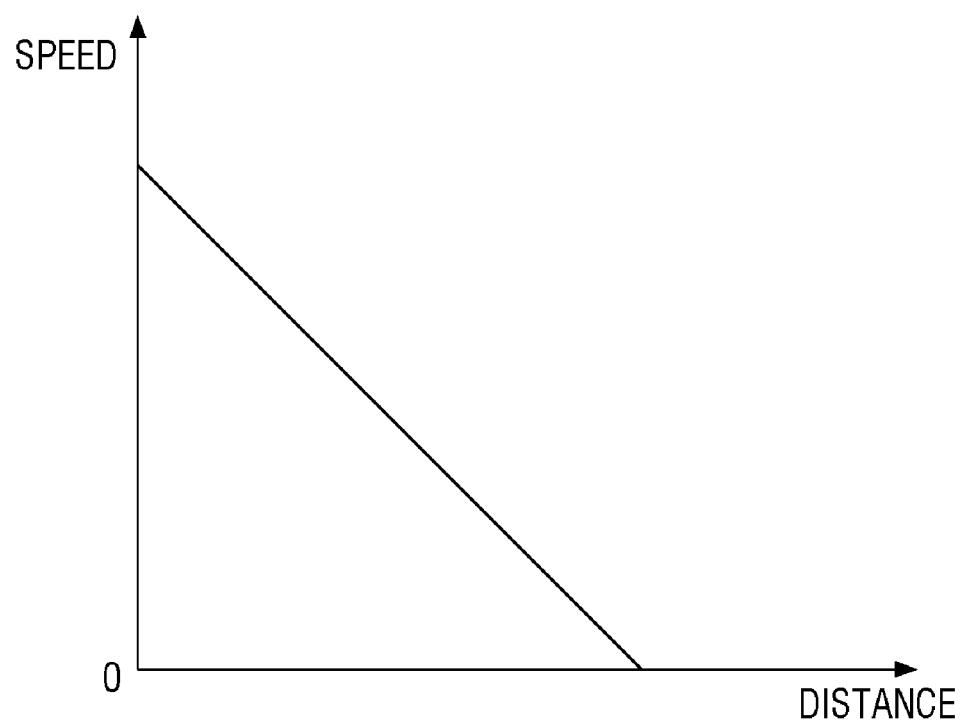
FIG. 11 is a first graph for showing the speed of the driving device according to the sensed distance.
Figure 12:
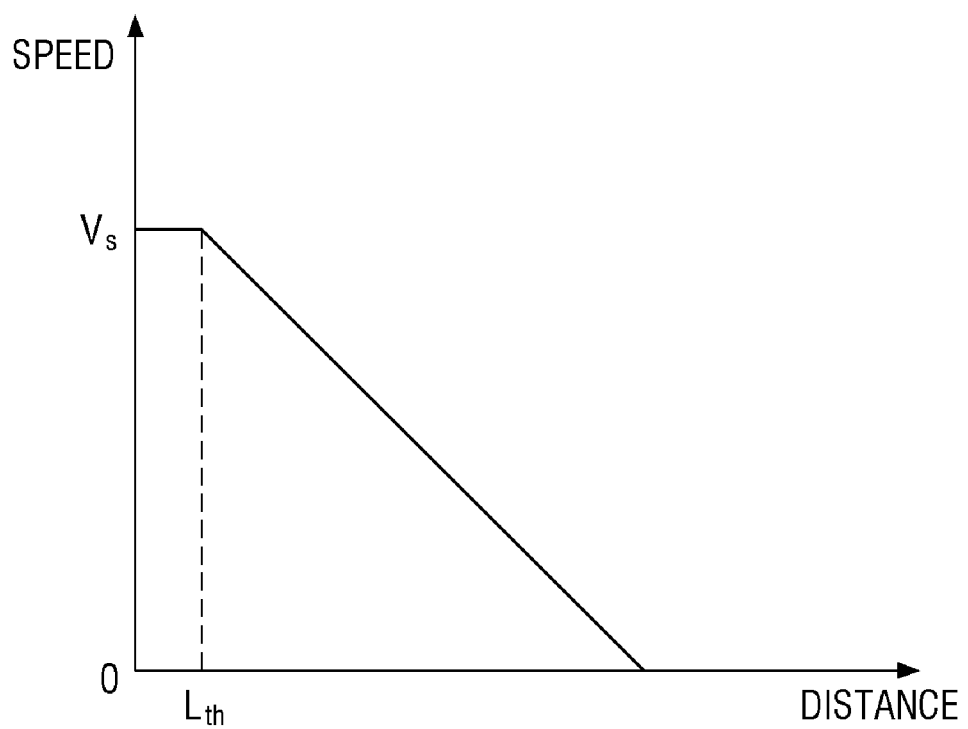
FIG. 12 is a second graph for showing the speed of the driving device according to the sensed distance.

FIGS. 11 and 12 are graphs 703 and 704 showing the speed of the driving device according to the sensed distance.

Referring to FIG. 11, as the distance sensed by the non-contact type sensing unit 220 decreases, the speed of the driving device 10 may increase.

The rate of increase in speed with decreasing distance may be predetermined. For example, the above-described constant may be appropriately determined to determine the speed according to the distance.

Referring to FIG. 12, a moving speed of the driving device 10 may be determined based on a preset threshold distance Lth.

When the distance to the adjacent object 20 sensed by the non-contact type sensing unit 220 is less than a preset threshold distance Lth, the control unit 300 may control the operating unit 400 so that the driving device 10 moves at a preset reference speed Vs. The reference speed Vs may be a speed before the distance to the adjacent object 20 enters less than a predetermined threshold distance Lth. Alternatively, the reference speed Vs may be a separately determined maximum speed of the driving device 10. For example, the reference speed Vs may be set to be lower than the user's walking speed.

As the speed of the driving device 10 is limited to the reference speed Vs, the occurrence of a safety accident may be prevented or the size of the safety accident may be reduced.

Figure 13:
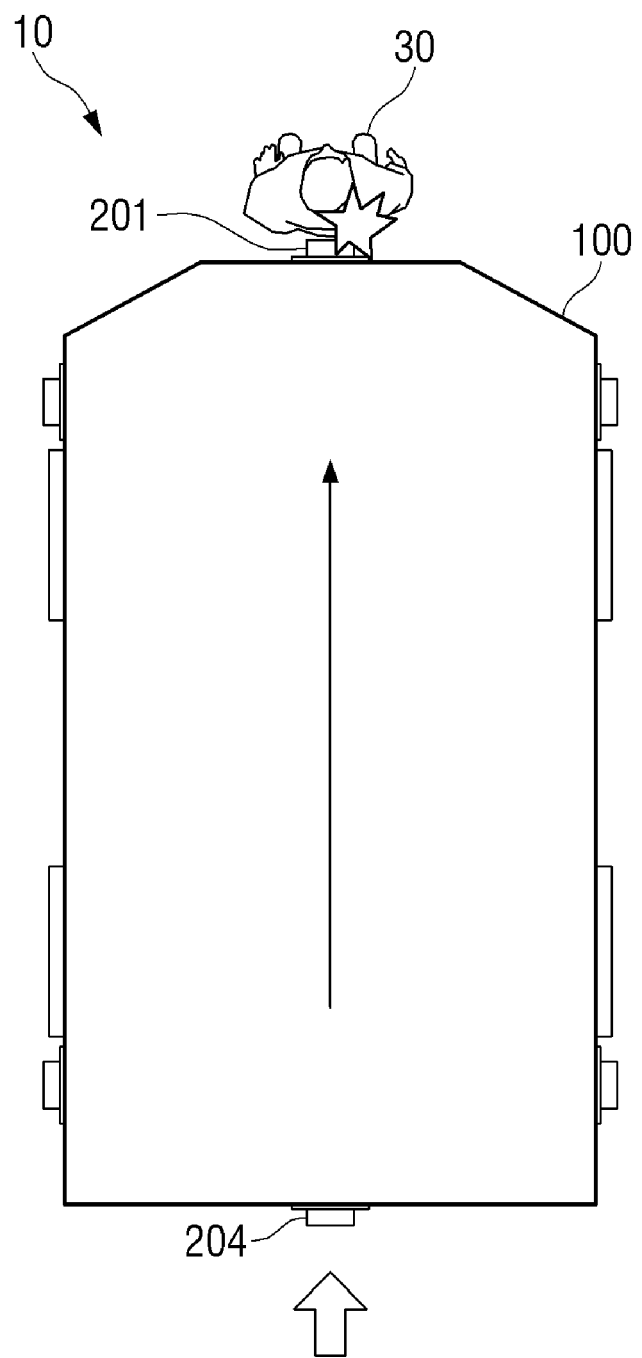
FIG. 13 is a diagram for describing that an input is sensed by two or more sensing units.

FIG. 13 is a diagram for describing that an input is sensed by two or more sensing units.

Referring to FIG. 13, the control unit 300 may generate a control command according to the number of sensing units that sense a user input.

Specifically, the control unit 300 may generate a control command for stopping the driving of the body 100 when two or more sensing units of the first to sixth sensing units 201 to 206 sense a user input. Referring to FIG. 13, the user may input a user command to the fourth sensing unit 204 to move the driving device 10 forward. For example, the user may press the fourth sensing unit 204 or place his or her hand adjacent to the fourth sensing unit 204.

As the fourth sensing unit 204 senses a user input, the driving device 10 may move forward. In this case, another user or an obstacle 30 may exist in front of the driving device 10. In this case, the first sensing unit 201 may sense a user input. That is, the first sensing unit 201 and the second sensing unit 202 simultaneously sense a user input.

In this way, when two or more user inputs are sensed, the control unit 300 may generate a control command for stopping the driving of the driving device 10. The control command is transmitted to the operating unit 400, and the operating unit 400 may urgently stop the operation of the driving unit 500 according to the control command. Accordingly, driving of the driving device 10 may be stopped, and a safety accident may be prevented or the size of a safety accident may be reduced.

Figure 14:
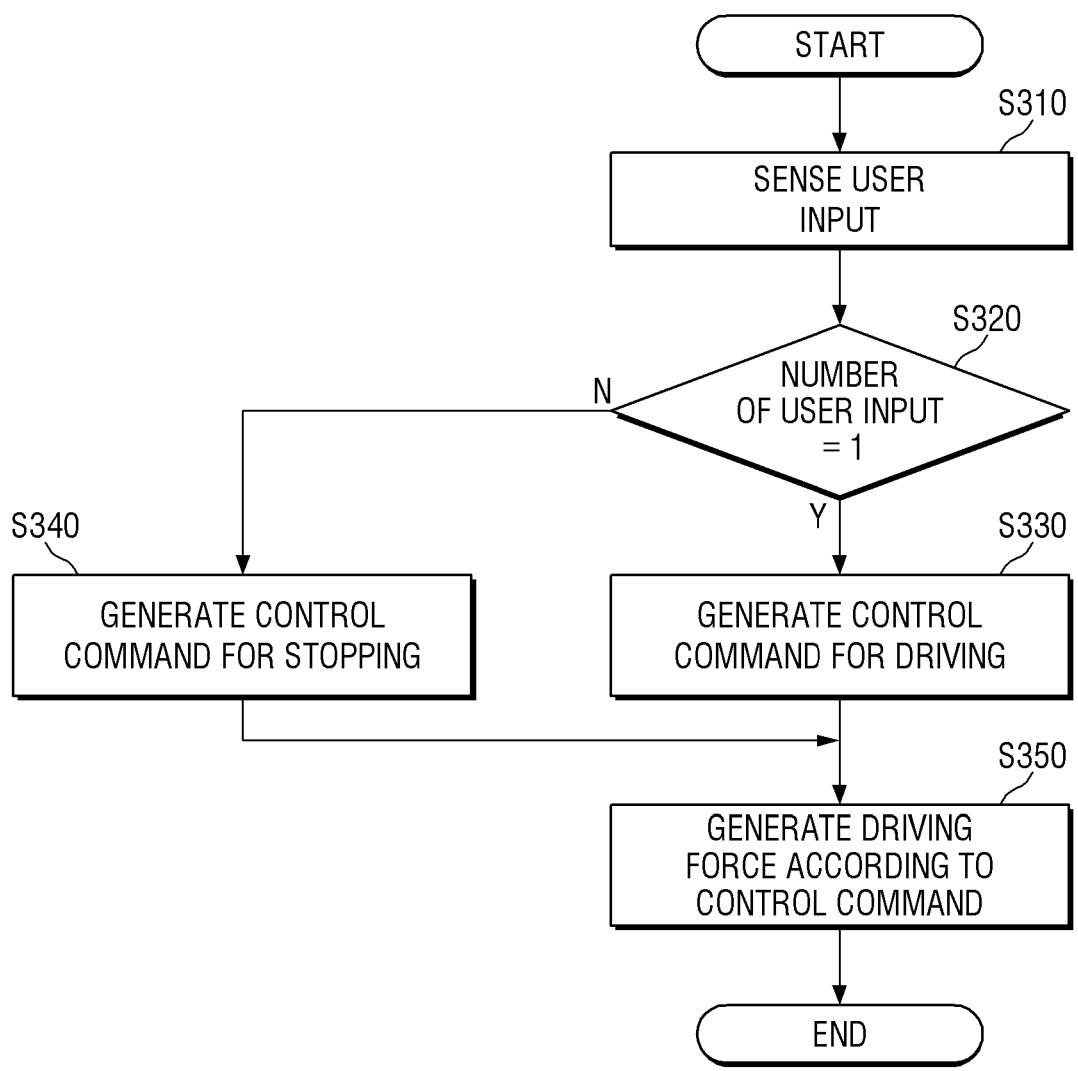
FIG. 14 is a flowchart showing a driving controlling method according to an embodiment of the present disclosure.

FIG. 14 is a flowchart showing a driving controlling method according to an embodiment of the present disclosure.

Referring to FIG. 14, first, while the first to sixth sensing units 201 to 206 are exposed to the outside of the body 100 provided in the driving device 10, one or more of the first to sixth sensing units 201 to 206 may sense a user input for controlling the driving of the body 100 (S310).

If there is a sensing unit that senses a user input among the first to sixth sensing units 201 to 206, the corresponding sensing unit transmits the sensing result to the control unit 300, and the control unit 300 may generate a control command for the driving of the body 100 according to the sensed user input.

In order to generate a control command, the control unit 300 may check whether the number of sensed user inputs is one (S320). Then, when the number of sensed user inputs is one, the control unit 300 may generate a control command for driving (S330). Meanwhile, when the number of sensed user inputs is not one, the control unit 300 may generate a control command for stopping (S340).

The control command generated by the control unit 300 is transmitted to the operating unit 400, and the operating unit 400 may generate a driving force according to the control command (S350). For example, when a control command for driving is transmitted, the operating unit 400 may control the driving unit 500 according to a driving command and a steering command included in the control command. Meanwhile, when a control command for stopping is transmitted, the operating unit 400 may control the driving unit 500 so that the driving device 10 stops.

At least one of the components, elements, modules, or units (collectively "components" in this paragraph) represented by a block in the drawings, such as the control unit 300 in FIG. 1, may be embodied as various numbers of hardware, software, and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above non-limiting example embodiments may be implemented in algorithms that execute on one or more processors. Furthermore, the components represented by a block or processing steps may employ any number of related art techniques for electronics configuration, signal processing and/or control, data processing and the like.

Although embodiments of the present disclosure have been described with reference to the above and the accompanying drawings, those of ordinary skill in the art, to which the present disclosure pertains, can understand that embodiments of the present disclosure may be implemented in other specific forms without changing the technical spirit or essential features. Therefore, it should be understood that the embodiments described above are illustrative and non-limiting in all respects.

What is claimed is:

1. A driving apparatus comprising:
a body;
at least one sensor that is in or on the body, and exposed to an outside of the body, and the at least one sensor is configured to sense a user input for controlling driving of the body;
a controller configured to generate at least one control command for driving of the body according to the sensed user input; and
a motor that is configured to generate a driving force for driving the body according to the generated at least one control command,
wherein the at least one sensor comprises a sensor on one side of the body in a first direction, and the controller is configured to generate the at least one control command to cause the body to drive in a particular direction based on a direction relative to the body from which the sensed user input is provided, such that the at least one control command comprises a control command for driving the body in a second direction, opposite to the first direction, based on the sensor on the one side of the body in the first direction sensing the user input.

2. The driving apparatus of claim 1,
wherein the sensor is a contact type sensor that is configured to sense a pressure applied by pressing of an object that is outside of the body.

3. The driving apparatus of claim 2,
wherein the at least one control command, generated by the controller, includes a control command for changing speed of the body according to a magnitude of the pressure sensed by the contact type sensor,
wherein the control command for changing the speed of the body comprises:
a command for a first speed based on the pressure sensed by the contact type sensor having a first magnitude; and
a command for a second speed based on the pressure sensed by the contact type sensor having a second magnitude,
wherein the first speed and the second speed are different from each other and greater than zero, and
wherein the first magnitude and the second magnitude of the pressure are different from each other and greater than zero.

4. The driving apparatus of claim 1,
wherein the sensor is a non-contact type sensor that is configured to sense an object adjacent to the non-contact type sensor at a predetermined distance.

5. The driving apparatus of claim 4,
wherein the at least one control command, generated by the controller, includes a control command for changing speed of the body according to a distance between the non-contact type sensor and the object that is adjacent to the non-contact type sensor,
wherein the control command for changing the speed of the body comprises:
a command for a first speed based on the distance sensed by the non-contact type sensor being a first distance; and
a command for a second speed based on the distance sensed by the non-contact type sensor being a second distance,
wherein the first speed and the second speed are different from each other and greater than zero, and
wherein the first distance and the second distance are different from each other.

6. The driving apparatus of claim 1,
wherein the at least one control command comprises:
a driving command for moving the body forward or backward; and
a steering command for turning the body left or right.

7. The driving apparatus of claim 1,
wherein the at least one sensor is a plurality of sensors that are arranged at different points of the body.

8. The driving apparatus of claim 7,
wherein the controller is configured to generate the at least one control command for driving of the body in accordance with a driving direction of the body that is preset for each of the plurality of sensors.

9. The driving apparatus of claim 7,
wherein the controller is further configured to generate a stop control command, for stopping driving of the body, based on two or more sensors of the plurality of sensors sensing a respective user input.

10. The driving apparatus of claim 1 further comprises:
a driving unit that is configured to drive the body with the driving force of the motor,
wherein the driving unit is a wheel, a track, a leg, or a propeller.

11. A driving controlling method for controlling driving of a driving apparatus, the method comprising:
sensing a user input for controlling driving of a body of the driving apparatus by at least one sensor of the driving apparatus that is in or on the body and exposed to an outside of the body;
generating at least one control command for driving the body according to the sensed user input; and
generating a driving force, for driving the body, according to the generated at least one control command,
wherein the at least one sensor comprises a sensor on one side of the body in a first direction, and
wherein the generating the at least one control command comprises causing the body to drive in a particular direction based on a direction relative to the body from which the sensed user input is provided by generating a control command for driving the body in a second direction, opposite to the first direction, based on the sensor on the one side of the body in the first direction sensing the user input.

12. The driving controlling method of claim 11,
wherein the sensor is a contact type sensor that is configured to sense the user input, and
wherein the sensing the user input comprises sensing, by the contact type sensor, a pressure applied by pressing of an object that is outside of the body.

13. The driving controlling method of claim 12,
wherein the generating the at least one control command comprises generating a control command for changing speed of the body according to a magnitude of the pressure sensed by the contact type sensor,
wherein the generating the control command for changing the speed of the body comprises:
generating a command for a first speed based on the pressure sensed by the contact type sensor having a first magnitude; and
generating a command for a second speed based on the pressure sensed by the contact type sensor having a second magnitude,
wherein the first speed and the second speed are different from each other and greater than zero, and
wherein the first magnitude and the second magnitude of the pressure are different from each other and greater than zero.

14. The driving controlling method of claim 11,
wherein the sensor is a non-contact type sensor that is configured to sense the user input, and
wherein the sensing the user input comprises sensing, by the non-contact type sensor, an object adjacent to the non-contact type sensor at a predetermined distance.

15. The driving controlling method of claim 14,
wherein generating the at least one control command comprises generating a control command for changing speed of the body according to a distance between the non-contact type sensor and the object that is adjacent to the non-contact type sensor,
wherein the generating the control command for changing the speed of the body comprises:
generating a command for a first speed based on the distance sensed by the non-contact type sensor being a first distance; and
generating a command for a second speed based on the distance sensed by the non-contact type sensor being a second distance,
wherein the first speed and the second speed are different from each other and greater than zero, and
wherein the first distance and the second distance are different from each other.

16. The driving controlling method of claim 11,
wherein the at least one control command includes:
a driving command for moving the body forward or backward; and
a steering command for turning the body left or right.

17. The driving controlling method of claim 11,
wherein the at least one sensor is a plurality of sensors that are arranged at different points of the body.

18. The driving controlling method of claim 17,
wherein the generating the at least one control command for driving the body comprises generating the at least one control command in accordance with a driving direction of the body that is preset for each of the plurality of sensors.

19. The driving controlling method of claim 11,
wherein the at least one sensor is a plurality of sensors, and
wherein the method further comprises generating a stop control command, for stopping the driving of the body, based on two or more sensors of the plurality of sensors sensing a respective user input.

20. The driving controlling method of claim 11,
wherein the driving apparatus further includes a driving unit that is configured to drive the body with the driving force, and
wherein the driving unit is a wheel, a track, a leg, or a propeller.

* * * * *